United States Patent
Pereira et al.

(10) Patent No.: US 9,794,202 B1
(45) Date of Patent: Oct. 17, 2017

(54) MESSAGING INCLUDING STANDARD AND CUSTOM CHARACTERS

(71) Applicant: Amojee, Inc., Saratoga, CA (US)

(72) Inventors: Fernando L. Pereira, Sunnyvale, CA (US); Jay H. Yim, Dublin, CA (US); Mike Kaizuka, Mountain View, CA (US); Jeffrey D. Sanders, San Jose, CA (US); John B. Georges, Saratoga, CA (US)

(73) Assignee: Amojee, Inc., Saratoga, CA (US)

( * ) Notice: Subject to any disclaimer, the term of this patent is extended or adjusted under 35 U.S.C. 154(b) by 0 days.

(21) Appl. No.: 15/352,328

(22) Filed: Nov. 15, 2016

Related U.S. Application Data

(60) Provisional application No. 62/379,332, filed on Aug. 25, 2016.

(51) Int. Cl.
*G06F 15/16* (2006.01)
*H04L 12/58* (2006.01)
*H04L 29/06* (2006.01)

(52) U.S. Cl.
CPC .......... *H04L 51/046* (2013.01); *H04L 51/10* (2013.01); *H04L 51/16* (2013.01); *H04L 51/38* (2013.01); *H04L 67/42* (2013.01)

(58) Field of Classification Search
CPC ....... H04L 51/046; H04L 51/10; H04L 51/16; H04L 51/38; H04L 67/42
USPC ........................................................ 709/206
See application file for complete search history.

(56) References Cited

U.S. PATENT DOCUMENTS

| | | | | |
|---|---|---|---|---|
| 6,925,595 | B1 * | 8/2005 | Whitledge | G06F 17/30905 707/999.004 |
| 7,133,900 | B1 * | 11/2006 | Szeto | H04L 51/04 709/203 |
| 7,752,270 | B2 * | 7/2010 | Durand | G06Q 10/107 709/204 |
| 8,605,718 | B2 * | 12/2013 | Hemar | G06Q 30/02 370/259 |
| 8,726,195 | B2 * | 5/2014 | Bill | G06Q 10/10 715/733 |
| 9,052,792 | B2 * | 6/2015 | Chavan | G06Q 30/0253 |
| 9,288,303 | B1 * | 3/2016 | Logan | H04M 1/72552 |
| 9,380,433 | B2 * | 6/2016 | Park | G06Q 10/10 |

(Continued)

OTHER PUBLICATIONS

Office Action dated Jan. 6, 2017, in U.S. Appl. No. 15/352,354, filed Nov. 15, 2016.

(Continued)

*Primary Examiner* — Tauqir Hussain
(74) *Attorney, Agent, or Firm* — Vierra Magen Marcus LLP

(57) ABSTRACT

Embodiments of the present technology enable messages including both standard and custom characters to be communicated between client devices. Each of the standard character(s) is included within a Unicode Standard that is supported by an operating system of a client device. By contrast, each of the custom character(s) is not included within the Unicode Standard. Such embodiments enable users to create their own custom characters, such as custom emoji, or utilize custom characters created others. Beneficially, embodiments described herein overcome many of the drawbacks associated with electronic messages being limited to including only standard characters, such as standard emoji.

26 Claims, 7 Drawing Sheets

(56) References Cited

U.S. PATENT DOCUMENTS

| | | | |
|---|---|---|---|
| 2001/0029542 A1* | 10/2001 | Nishimura | G06F 17/2223 709/231 |
| 2004/0024822 A1* | 2/2004 | Werndorfer | G06F 3/0481 709/206 |
| 2007/0176802 A1 | 8/2007 | Fay et al. | |
| 2009/0158190 A1* | 6/2009 | Higginson | G06F 3/0481 715/773 |
| 2010/0151889 A1* | 6/2010 | Chen | G06F 17/30976 455/466 |
| 2010/0178947 A1* | 7/2010 | Kim | H04M 1/72552 455/466 |
| 2012/0143498 A1 | 6/2012 | Zubas et al. | |
| 2012/0192059 A1 | 7/2012 | Laskaris et al. | |
| 2012/0221962 A1* | 8/2012 | Lew | H04L 29/12896 715/752 |
| 2013/0240616 A1* | 9/2013 | Huang | G09G 5/22 235/375 |
| 2014/0181634 A1 | 6/2014 | Compain et al. | |
| 2014/0189027 A1* | 7/2014 | Zhang | H04L 51/02 709/206 |
| 2015/0334044 A1* | 11/2015 | Auerbach | H04L 67/306 709/203 |
| 2016/0179331 A1 | 6/2016 | Ahuja et al. | |
| 2016/0261675 A1 | 9/2016 | Block et al. | |
| 2016/0277333 A1* | 9/2016 | Yuan | H04L 51/04 |
| 2016/0352667 A1* | 12/2016 | Pickett | H04L 51/16 |
| 2016/0359777 A1* | 12/2016 | Tucker | H04L 51/10 |
| 2017/0026254 A1* | 1/2017 | Adylov | H04L 43/04 |
| 2017/0041272 A1* | 2/2017 | Chang | H04L 51/063 |

OTHER PUBLICATIONS

Amendment dated Apr. 5, 2017, in U.S. Appl. No. 15/352,354, filed Nov. 15, 2016.

Notice of Allowance dated Apr. 26, 2017, in U.S. Appl. No. 15/352,354, filed Nov. 15, 2016.

* cited by examiner

MESSAGING INCLUDING STANDARD AND CUSTOM CHARACTERS

PRIORITY CLAIM

The present application claims priority to U.S. Provisional Patent Application No. 62/379,332, filed Aug. 25, 2016, which is incorporated herein by reference.

BACKGROUND

Electronic messaging, such as text messaging, has become increasing popular over the past few decades. Indeed, many users prefer using text messaging over voice communications. Text messaging is a method of communicating short messages between various types of client devices using Short Message Service (SMS) or Multimedia Messaging Service (MMS) protocols. Messages sent via SMS are limited to 160 characters in length. MMS messages may contain longer strings of text, as well as photo, audio, or video data. Messages sent over both protocols are commonly referred to as "text messages" or "texts."

Because SMS messages are limited to 160 characters in length, users have developed shorthand conventions for expressing common sentiments in such messages, such as "LOL" ("laughing out loud"), "IMO" ("in my opinion"), "OIC" ("oh I see), and many others. Although MMS messages do not share the same length limitation, such messages typically are similarly brief due to a variety of factors, including user convention, device interface considerations, historical technological limitations, and bandwidth concerns. Thus, these shorthand conventions are common in text messages sent both by SMS and by MMS.

Some of these common abbreviations are known as emoticons. Emoticons use text characters to depict certain emotions, usually as representations of facial expressions. For example, probably the most common emoticon is a "smiley face," typically drawn as two or three characters: ":)" or ":-)". Other common emoticons include ";)" (a wink), ":D" (an extra-large or open-mouthed smile), and ":P" (tongue sticking out). Emoticons allow text users to express complex emotions using very few characters, conserving available space in text messages and reducing typing requirements.

Another type of symbol used in text messages are emoji characters, which can also be referred to more succinctly as emoji. Emoji are small digital images or icons that are used to express things, ideas, emotions, etc., in electronic communication. A very popular use of emoji are in text messages that are sent from one mobile device (e.g., a smart phone) to another. Some such emoji are static images, while others may be animated.

Text messages are typically limited to including Unicode Standard characters. The Unicode Standard, which is maintained by the Unicode Technical Committee, is a character coding system designed to support the worldwide interchange, processing, and display of the written texts of the diverse languages and technical disciplines of the modern world. In addition, it supports classical and historical texts of many written languages. The latest version of the Unicode Standard is Version 9.0.0, which supports a total of 128,172 characters, was released in June 2016. Those Unicode Standard characters include, inter alia, alphabetical characters (that can be used alone, or strung together to make words), numerical characters (that can be used alone, or strung together to represent larger numbers), and emoji characters. Alphabetical characters and numerical characters, alone or in combination, can be referred to more generally as alphanumeric text.

One drawback of available emoji being limited to those included in the Unicode Standard is that users are unable to customize the images they send to express any sentiment beyond those already provided by the Unicode Standard. Moreover, the set of emoji included in the Unicode Standard may be particularly limited compared to the various thoughts that a user may wish to express in a text message. Further, emoji and/or other standard characters may look different on different client devices, depending upon the model of the client device and the operating system version being run on the client device.

SUMMARY

Embodiments of the present technology enable messages (e.g., text message) including both standard and custom characters to be communicated between client devices. A method according to an embodiment includes the step of accepting and displaying, via a user interface of a client device, a message within a message entry field, wherein the message includes one or more standard characters and one or more custom characters that are selected by a user associated with the client device. A unique custom character reference, one or more tag words, and image data are associated with each of the custom character(s). Each of the standard character(s) is included within a Unicode Standard. By contrast, each of the custom character(s) is not included within the Unicode Standard.

In response to accepting an indication that the user of the client device wants to send the message within the message entry field to a further user associated with a further client device, message data is sent from the client device to the further client device. Such message data includes the one or more standard characters included in the message entry field, the unique custom character reference associated with each of the custom character(s) included in the message entry field, and at least one tag word associated with each of the custom character(s) included in the message entry field. In such an embodiment, the sending of the unique custom character reference associated with each of the custom character(s) included in the message entry field, from the client device to the further client device, enables the further client device to obtain the image data associated with each of the custom character(s) from a local data store (also known as a datastore) of the further client device or from a remote server, and thus, without the client device sending the image data associated with each of the custom character(s) to the further client device. In accordance with an embodiment, the standard characters that are included within the Unicode Standard are selectable by a user of the client device via a virtual keyboard of the user interface of the client device. Image data for the standard characters (that are included within the Unicode Standard) are provided by the operating system of the client device, which is stored in a local data store of the client device. By contrast, the image data for each of the custom character(s) is not provided by the operating system of the client device.

In accordance with an embodiment, a local data store of a client device stores a unique custom character reference for each of a plurality of custom characters, image data for each of the plurality of custom characters for which the unique custom character reference is stored, and one or more tag words for each of the plurality of custom characters for which the unique custom character reference is stored. Some such data can be obtained by the client device when a messaging application that implements an embodiment of the present technology is downloaded by the client device. Other such data can be obtained in response to queries, and/or in response to a user creating one or more new custom characters.

In accordance with an embodiment of the present technology, each time a standard character is selected for inclusion in the message entry field via the user interface of the client device, both a local query to the local data store of the client device and a remote query to a remote server are issued, to thereby identify unique custom character references that have a tag word associated with the accepted standard character or a sequence of standard characters including the accepted standard character, if any exist. The unique custom character reference(s) that is/are returned in response to the local query are compared to the unique custom character reference(s) that is/are returned in response to the remote query to thereby identify which custom character image data is not yet stored in the local data store of the client device. Such an embodiment also includes obtaining, from the local data store of the client device, the image data for each of the unique custom character reference(s) identified in response to the local query. Further, the embodiment also includes obtaining, from the remote server, and saving in the local data store of the client device, the image data for each of the unique custom character reference(s) identified as not yet having been stored in the local data store of the client device. Additionally, the embodiment includes displaying, in a custom character tray, the one or more custom characters for which the image data is obtained from the local data store of the client device and from the remote server.

The aforementioned message entry field can be a message tray that is displayed via the user interface of the client device. In such an embodiment, after the message within the message tray is sent from the client device to a further client device, the message that was sent is thereafter displayed within a message bubble that is displayed via the user interface of the client device, with the message bubble being part of a displayed message thread that may or may not already include other message bubbles. Alternatively, the message entry field can itself be within message bubble that is displayed via the user interface of the client device, with the message bubble being part of a displayed message thread that may or may not already include other message bubbles. In certain embodiments, custom characters can be displayed outside of, or otherwise without, a message bubble.

In accordance with an embodiment of the present technology, any one of the custom character(s) can be a custom emoji created using a drawing tool, a custom alphanumeric character created using a drawing tool, a digital image or portion thereof obtained using a digital camera, or digital image or portion thereof obtained using a digital camera and modified using a drawing tool and/or a filter, but are not limited thereto. Further, it is noted that any one of the custom character(s) can be or have been created by the user of the client device, or can have been created by a different user of a different client device. In accordance with an embodiment, it is the creator of a custom character that gets to specify the one or more tag words that is/are associated with the custom character.

A method according to an embodiment of the present technology includes the step of a client device receiving message data from a further client device, wherein the message data includes one or more standard characters, one or more unique custom character references, and a tag word associated with each of the unique custom character reference(s). As noted above, each of the standard character(s) is included within a Unicode Standard. By contrast, each of the unique custom character references is associated with a corresponding custom character that is not included within the Unicode Standard. Such a method also includes the client device obtaining, for each of the unique custom character reference(s) included in the received message data, image data for the custom character associated with the unique custom character reference. The method also includes the step of displaying, via a user interface of the client device, the one or more standard characters received from the further client device and the one or more custom characters that is/are associated with the one or more unique custom character references included in the received message data. Such displaying can include displaying, within a message bubble, at least one of the one or more standard characters and at least one of the one or more custom characters such that they are in-line with one another within the message bubble.

In accordance with an embodiment, the client device obtains the image data for the custom character(s) associated with the unique custom character reference(s) in the following manner. The client device determines, for each unique custom character reference (of the one or more unique custom character references that is/are received by the client device from the further client device), whether image data associated with the unique custom character reference is stored in a local data store of the client device. For each unique custom character reference for which the client device determines that the image data associated therewith is stored in the local data store of the client device, the client device obtains that image data associated therewith from the local data store of the client device without the client device issuing a remote query for the image data associated therewith to a remote server. For each unique custom character reference for which the client device determines that the image data associated therewith is not stored in the local data store of the client device, the client device issues a remote query for the image data associated therewith to a remote server and receives the image data associated therewith from the remote server.

In accordance with an embodiment, while waiting for the image data for a custom character to be obtained from the remote server, the client device displays a default placeholder character in place of where the custom character is to be placed within a message bubble. Thereafter, the client device replaces the default placeholder character within the message bubble with the custom character after the image data for the custom character has been obtained from the remote server.

In accordance with an embodiment, a server system includes one or more processors and one or more data stores configured to store client data for each of a plurality of clients that are each associated with a respective client device. The one or more data stores are also configured to store a unique custom character reference, one or more tag words, and image data associated with each of a plurality of custom characters. Additionally, the one or more data stores store a server messaging application including instructions that are executable by the one or more processors.

In accordance with an embodiment, the server messaging application is operable to receive a unique custom character reference query including one or more standard characters from a client device, and in response thereto, identify one or more of the unique custom character references that have a tag word associate therewith that includes the one or more standard characters included in the unique custom character reference query. Further, the server messaging application is operable to send to the client device (from which the unique custom character reference query was received), a list of the identified one or more of the unique custom character references that have a tag word associate therewith that includes the one or more standard characters included in the unique custom character reference query. Additionally, the server messaging application is operable to receive an image data query including a unique custom character reference from the client device, and in response thereto, identify image data for a custom character associated with the unique custom character reference included in the image data query. The server messaging application is also operable to send to the client device from which the message data query was received, image data for the custom character associated with the unique custom character reference included in the image data query.

In accordance with an embodiment, the server messaging application is also operable to receive a tag word query including a unique custom character reference from the client device, and in response thereto, identify one or more tag words associated with the unique custom character reference included in the tag word query. Further, the server messaging application is also operable to send (to the client device from which the tag word query was received), the one or more tag words associated with the unique custom character reference included in the tag word query. The server messaging application is also operable to receive from a client device associate with a user, image data associated with a new custom character created by the user and one or more tag words that the user specified as being associated with new custom character. Additionally, the server messaging application is operable to store within its data store, a unique custom character reference for the new custom character, the one or more tag words associated therewith, and the image data associated therewith.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
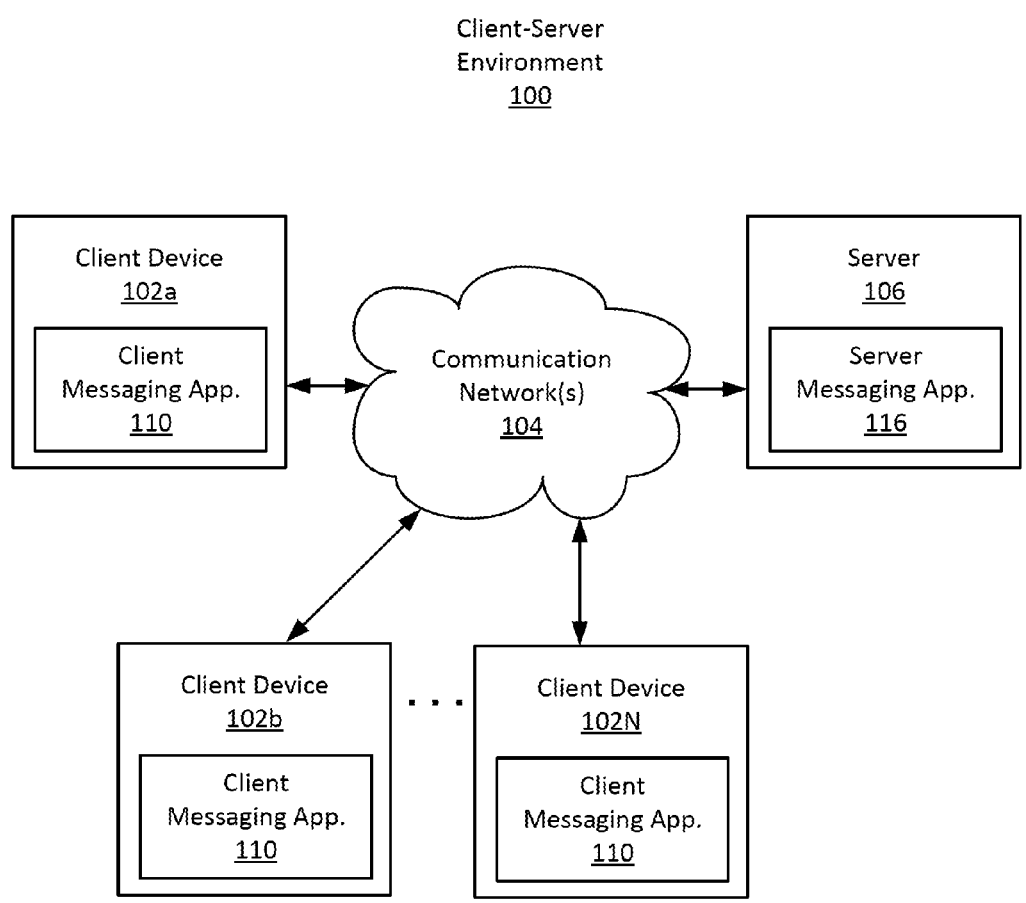
FIG. 1 is a high level block diagram of an exemplary client-server environment in which embodiments of the present technology may be implemented.

Conventionally, if a user desires to include emoji and alphanumeric characters in-line with one another, e.g., in same message bubble, then a user is limited to those emoji supported by the Unicode Standard. A potential problem, however, is that the Unicode Standard may not support an emoji that expresses the thing, idea, emotion, or the like, that the users wishes to express. In other words, because the Unicode Standard only supports emoji that are submitted to and selected by the Unicode Technical Committee, the Unicode Standard may not support images or icons that certain users may wish to express. Indeed, the Unicode Technical Committee takes into account very specific factors to determine whether or not they will accept a new emoji into the Unicode Standard, with such factors including compatibility, expected usage level, image distinctiveness, completeness and frequently requested being factors that favor inclusion in the Unicode Standard, and factors such as overlay specific, open-ended, already representable, and transient being factors for exclusion from the Unicode Standard. Additionally, the Unicode Technical Committee has indicated that they will exclude images or icons of company logos, or products strongly associated with a particular brand, from being included in the Unicode Standard. Further, the Unicode Technical Committee has indicated that they will exclude images or icons of specific people (whether historic or living) and deities, from being included in the Unicode Standard.

The Unicode Standard defines a codespace (also known as code space) of code points within a range hexadecimal values. Normally a Unicode code point is referred to by writing "U+" followed by its hexadecimal number. An additional problem with sending messages including emoji supported by the Unicode Standard is that different venders' representation of a specific hexadecimal code will often differ from one another. For example, the image or icon for a "grinning face" that corresponds to the hexadecimal code U+1F600, is different for Apple™, Google™, Twitter™, Facebook Messenger™, Windows™, Gmail™, Sumsung™, etc. Accordingly, if a user sends a text message that includes the "grinning face" emoji from an Apple iPhone™ to a Windows™ phone, the emoji will look different when viewed on the receiving client device, than the emoji looked on the sending client device, with the different looking emoji having a different meaning than what was originally intended. Additionally, where an emoji is supported by the sending client device but not by the receiving client device, the emoji when viewed on the receiving client device will be displayed as a default icon, such as question mark or alien within a box, which represents an unknown character. For a specific example, while the Unicode Standard specifies that hexadecimal code U+1F98A corresponds to "fox face," Apple™ does not provide an emoji for this character, but Windows™ does. Accordingly, if a user of a Window™ phone attempts to send a fox face emoji to a user of an Apple iPhone™, the user viewing the message on their iPhone™ will not see a fox face, but rather will see a question mark within a box.

Embodiments of the present technology can be used to overcome the above described limitations associated with Unicode Standard emoji. More specifically, certain embodiments of the present technology allow custom (i.e., non- Unicode Standard) emoji and other custom characters to be created and/or selected by users for sending from one client device to another. Beneficially, certain embodiments of the present technology enable the custom (i.e., non-Unicode standard) emoji characters to be included within the same message bubble as, and in-line with, standard alphanumeric characters. This is in contrast to other applications that allow for the creation of custom emoji. More specifically, other applications that allow a user to create and send custom emoji do not enable the custom emoji to be included in the same message bubble as alphanumeric text. Rather, other applications that allow a user to create and send custom emoji typically only allow alphanumeric text to be sent in a separate message bubble and/or on a different line than the custom emoji, and thus, the custom emoji is not in-line with the alphanumeric text. Accordingly, if a user wanted to include emoji and alphanumeric text in-line with one another in same message bubble, then the user had been limited to those emoji supported by the Unicode Standard.

Additionally, embodiments of the present technology also enable other types of custom characters to be created and included in electronic messages, besides custom emoji. For example, embodiments of the present technology also enable custom alphanumeric characters to be created, selected and included in electronic messages.

Before describing specific embodiments of the present technology, an exemplary client-server environment in which embodiments of the present technology may be useful is first described with reference to FIGS. 1-3. Thereafter, FIG. 4 will be used to describe an exemplary messaging user interface, in accordance with an implementation of the present technology. The high level flow diagrams of FIGS. 5 and 6 will then be used to summarize methods for authoring, displaying and sending messages including both standard and custom characters, and receiving and displaying messages including both standard and custom characters. FIG. 7 will then be used to summarize a method, performed by a server system, for responding to queries issued by client devices, which enables the client devices to author, display, send and receive messages including both standard and custom characters. The term "standard character," as used herein, refers to a character that is included in a Unicode Standard, such as Unicode 9.0.0, or some earlier or later Unicode Standard version that is supported by a client device. By contrast, the term "custom character," as used herein, refers to a character that is not included within the Unicode Standard that is supported by a client device. Each custom character can be a custom alphanumeric character, a custom icon (e.g., a custom emoji), or a digital photograph (or portion thereof), but is not limited thereto.

Client-Server Environment

Referring initially to FIG. 1, illustrated therein is an exemplary client-server environment 100 that includes multiple client devices 102a, 102b ... 102N and a server system 106. The client devices 102a, 102b ... 102N can be referred to individually as a client device 102, or collectively as client devices 102. The client devices 102 and server system 106 are communicatively coupled by one or more communication networks 104. In some implementations, the client-server environment 100 is a messaging environment, in which client devices 102 can send electronic messages (e.g., text messages) to each other through the server system 106. Depending upon implementation, an electronic message may include one or more of: text, hyperlinks, emoji, virtual stickers, image(s), audio, and video. The server system 106 operates a messaging service that facilitates the sending and receiving of electronic messages by the client devices 102.

The client-server environment 100 can also be referred to more generally as a system 100, or more specifically as a messaging system 100. Electronic messages can be referred to more succinctly herein simply as messages.

The communication network(s) 104 can be any wired or wireless local area network (LAN) and/or wide area network (WAN), such as an intranet, an extranet, or the Internet. It is sufficient that the communication network 104 provides communication capability between the client devices 102, the server system 106, and optional other devices and systems. In some implementations, the communication network(s) 104 uses the HyperText Transport Protocol (HTTP) to transport information using the Transmission Control Protocol/Internet Protocol (TCP/IP). HTTP permits client devices 102 to access various resources available via the communication network(s) 104. The various implementations described herein, however, are not limited to the use of any particular protocol.

The client-server environment 100 includes multiple client devices 102. A respective client device 102 is any suitable computing device that, in some implementations, is capable of connecting to the communication network(s) 104, receiving from the server system 106 messages originating from other client devices 102, sending to the server system 106 messages intended for other client devices 102, and presenting, managing, and inputting/editing messages. In some implementations, the client device 102 is a smartphone, a mobile phone, a tablet device, a computing device of a vehicle of a user (e.g., an in-vehicle communications system, an in-vehicle entertainment system, an in-vehicle navigation system), a wearable apparatus of the user that includes a computing device (e.g., a watch of the user having a computing device, glasses of the user having a computing device, a wearable music player), a desktop computer, a laptop computer, a netbook computer, a gaming device, a multimedia player device, or any other device that is capable of sending and receiving messages, as well as presenting (e.g., displaying), managing, and inputting/editing messages. In some implementations, the client device 102 includes an image capture device (e.g., a camera).

In some implementations, the client device 102 includes a client messaging application 110, which is operable to implement specific embodiments of the present technology. More specifically, the client messaging application 110 enables the client device to author, display, send and receive message data that includes both standard characters and custom characters, in accordance with specific embodiments of the present technology. The client messaging application 110 can be downloaded to a client device 102 from an application store, which is also known as an "app store" or an "app marketplace". It is also possible that the client messaging application 110 can be downloaded to a client device 102 in response to the user of the client device 102 registering with the server 112 via a registration webpage served by the server 112. Other variations are also possible, and within the scope of the embodiments described herein. Additional details of the client device 102, and the client messaging application 110, are described below, e.g., with reference to FIGS. 2, 4 and 5.

Messages sent by a client device 102 are sent to the server system 106, which sends the messages to a respective destination client device 102. The server system 106 includes a server messaging application 116, which is operable to implement specific embodiments of the present technology. The server system 106 operates a messaging service in which client devices 102 can send and receive messages to/from each other. More specifically, the server system 106 facilitates connections between client devices 102 for sending and receiving messages, including receiving message data from client devices 102, sending message data to destination client devices 102, and maintaining user accounts and data with respect to the messaging service. The server system 106 can also store copies of the messages exchanged by the client devices 102. Additional details of the server system 106, and the server messaging application 116, are described below, e.g., with reference to FIGS. 3 and 6.

The server system 106 is described herein as a single server computer for sake of convenience and ease of understanding. It should be appreciated, however, that the server system 106 may be implemented as a single server computer or as multiple server computers (e.g., in a distributed server system). More generally, the server system 106 can include one or more processors and one or more data stores that are used to support a messaging service according to an embodiment of the present technology. When a client device 102 communicates with the server system 106, the server system 106 may be referred to as a remote server, since the server system 106 is remotely located relative to the client device 102. Similarly, a data store associated with the server system 106 may be referred to as a remote data store, since the data store is remote relative to the client device.

Client Device

Figure 2:
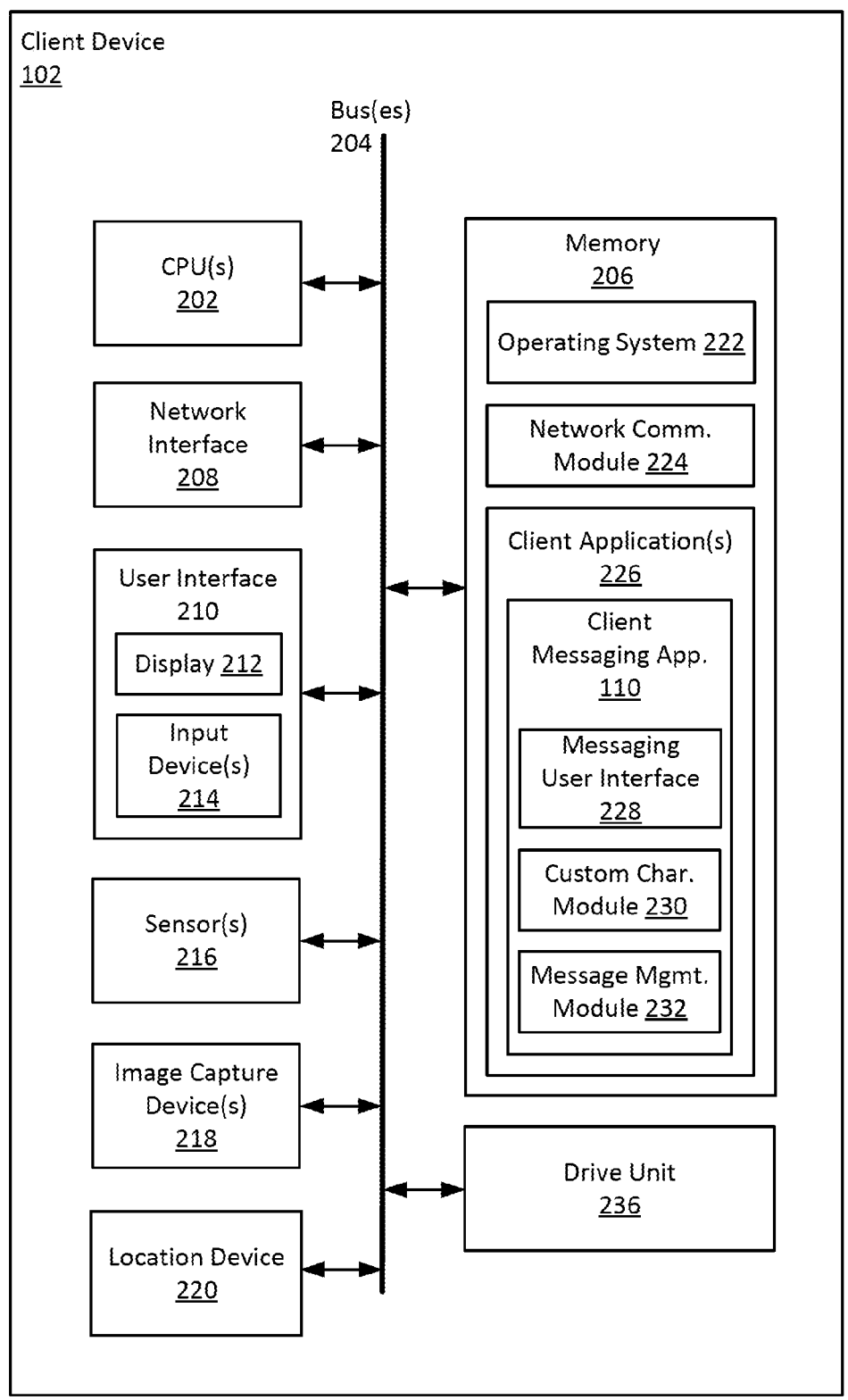
FIG. 2 is high level a block diagram illustrating exemplary details of a client device, included in the exemplary client-server environment introduced in FIG. 1.

FIG. 2 is a block diagram illustrating exemplary details of a client device 102 in accordance with some implementations. Referring to FIG. 2, the client device 102 is shown as including one or more processors (e.g., CPU's) 202, one or more network or other communications interfaces 208, a user interface 210, a memory 206, a drive unit 236, and one or more communication buses 204 for interconnecting these and other components. The communication buses 204 optionally include circuitry (sometimes called a chipset) that interconnects and controls communications between system components. The user interface 210 includes a display device 212 and one or more input devices 214.

In some implementations, the display device 212 is integrated with the device (e.g., housed in the same chassis as the CPU and memory, such as with a smartphone or a tablet computer). In some other implementations, the display device 212 is separate from other components of the client device 102 (e.g., a separate device from the device that houses the CPUs 202 and memory 206, such as with a desktop computer with a "tower" chassis housing the CPU and memory and a separate display device). Where the client device 102 is a mobile device, such as a smart phone, tablet computer, smart watch, or the like, the display device 212 is most likely integrated with the device.

In some implementations, the input device(s) 214 include one or more of: a mouse or similar pointing device, a keyboard, a touch-sensitive surface (e.g., a touch pad, a touch-sensitive display), a joystick, and one or more buttons. In some implementations, the display device 212 is a touch screen (i.e., a touch-sensitive display) that, as described below, may display a virtual keyboard.

In some implementations, the client device 102 includes additional input devices, such as an audio input device (e.g., a microphone). In some implementations, the client device 102 includes an audio output device (e.g., a speaker, headphones).

In some implementations, the client device 102 also includes one or more sensors 216 (e.g., accelerometer, magnetometer, proximity sensor, gyroscope), an image capture device 218 (e.g., a camera device or module and related components), and a location device 220 (e.g., a Global Positioning System (GPS) receiver or other navigation or geolocation device and related components).

The memory 206 can be used to store software and/or firmware that controls the client device 102, as well to store machine readable executable code for the client messaging application 110. Further, the memory 206 can also store sensor data obtained using one or more sensors 216, image data captured using the image capture device 218, but is not limited thereto. Various different types of memory, including non-volatile and volatile memory can be included in the mobile computing device 102. For example, the memory 206 can include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 206 may optionally include one or more storage devices remotely located from the CPU(s) 202. The memory 206, or alternatively the non-volatile memory device(s) within memory 206, comprises a non-transitory computer readable storage medium. In some implementations, the memory 206 or the computer readable storage medium of memory 206 store the following programs, modules and data structures, or a subset thereof, including: an operating system 222, network communication module 224, and one or more client applications 226.

A drive unit 236, e.g., a hard drive, but not limited thereto, can also be used to store software that controls the client device 102, as well to store images captured using the image capture device 218, but is not limited thereto. The memory 206 and the drive unit 236 can include a machine readable medium on which is stored one or more sets of executable instructions (e.g., apps) embodying one or more of the methodologies and/or functions described herein. In place of the drive unit 236, or in addition to the drive unit, the client device 102 can include a solid-state storage device, such as those comprising flash memory or any form of non-volatile memory. The terms "machine-readable medium" and "processor readable storage device" as used herein should be taken to include all forms of storage media, either as a single medium or multiple media, in all forms; e.g., a centralized or distributed database and/or associated caches and servers; one or more storage devices, such as storage drives (including e.g., magnetic and optical drives and storage mechanisms), and one or more instances of memory devices or modules (whether main memory, cache storage either internal or external to a processor, or buffers. The term "machine-readable medium," "computer-readable medium," and "processor readable storage device" shall be taken to include any tangible non-transitory medium which is capable of storing or encoding a sequence of instructions for execution by the machine and that cause the machine to perform any one of the methodologies. The term "non-transitory medium" expressly includes all forms of storage drives (optical, magnetic, etc.) and all forms of memory devices (e.g., DRAM, Flash (of all storage designs), SRAM, MRAM, phase change, etc., as well as all other structures designed to store information of any type for later retrieval.

The memory 206, the disk unit 236 and/or other types of storage media of the client device 102 can be referred more generally herein as a data store. Further, because such storage media is part of the client device, such storage media will often be referred to as a local data store, so as to distinguish it from a remote data store associated with the remote server 112.

The operating system 222 includes procedures for handling various basic system services and for performing hardware dependent tasks, as well as obtaining readings from sensors 216. The operating system 222 also supports and enables the selection and display Unicode Standard characters.

The network communication module 224 facilitates communication with other devices and computers (e.g., other client devices 102, server system 106) via the one or more communication network interfaces 208 (wired or wireless) and one or more communication networks 104, such as the Internet, other wide area networks, local area networks, metropolitan area networks, and so on.

The client application(s) 226 perform various operations. In some implementations, the client applications 226 include the client messaging application 110. The client messaging application 110 is configured to, in conjunction with the messaging service operated by the server system 106, send and receive messages that include both standard characters and custom characters. The client messaging application 110 provides or includes a messaging user interface 228, a custom character module 230, and message management module 232. The messaging user interface 228 is configured to present user interfaces (e.g., graphical user interfaces and input fields) for user input of text for a message and user selection of a custom character, and receiving that user input and user selection. The custom character module 230 is configured to enable a user to create new custom characters and associate them with one or more tag words. The message management module 232 is configured to manage messages in accordance with user direction, including deleting, archiving, and organizing messages.

In some implementations, the location module 238 determines the location of the client device 102 (e.g., using GPS or other similar systems, location identification by IP address, etc.).

The client device 102 can stores messages sent and received by the client messaging application 110. In some implementations, the messages may be a time-limited set or number-limited set of the messages (e.g., last one months' worth, last two months' worth, last 100 messages for each message conversation with a respective user) sent and received by the client device 102. For any given message, the message can includes zero, one or more standard characters, and zero, one or more custom characters.

Each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise rearranged in various implementations. In some implementations, the memory 206 may store a subset of the modules and data structures identified above. Furthermore, the memory 206 may store additional modules and data structures not described above.

Although FIG. 2 shows a client device, FIG. 2 is intended more as functional description of the various features which may be present in a client device than as a structural schematic of the implementations described herein. In practice, and as recognized by those of ordinary skill in the art, items shown separately could be combined and some items could be separated.

Server System

Figure 3:
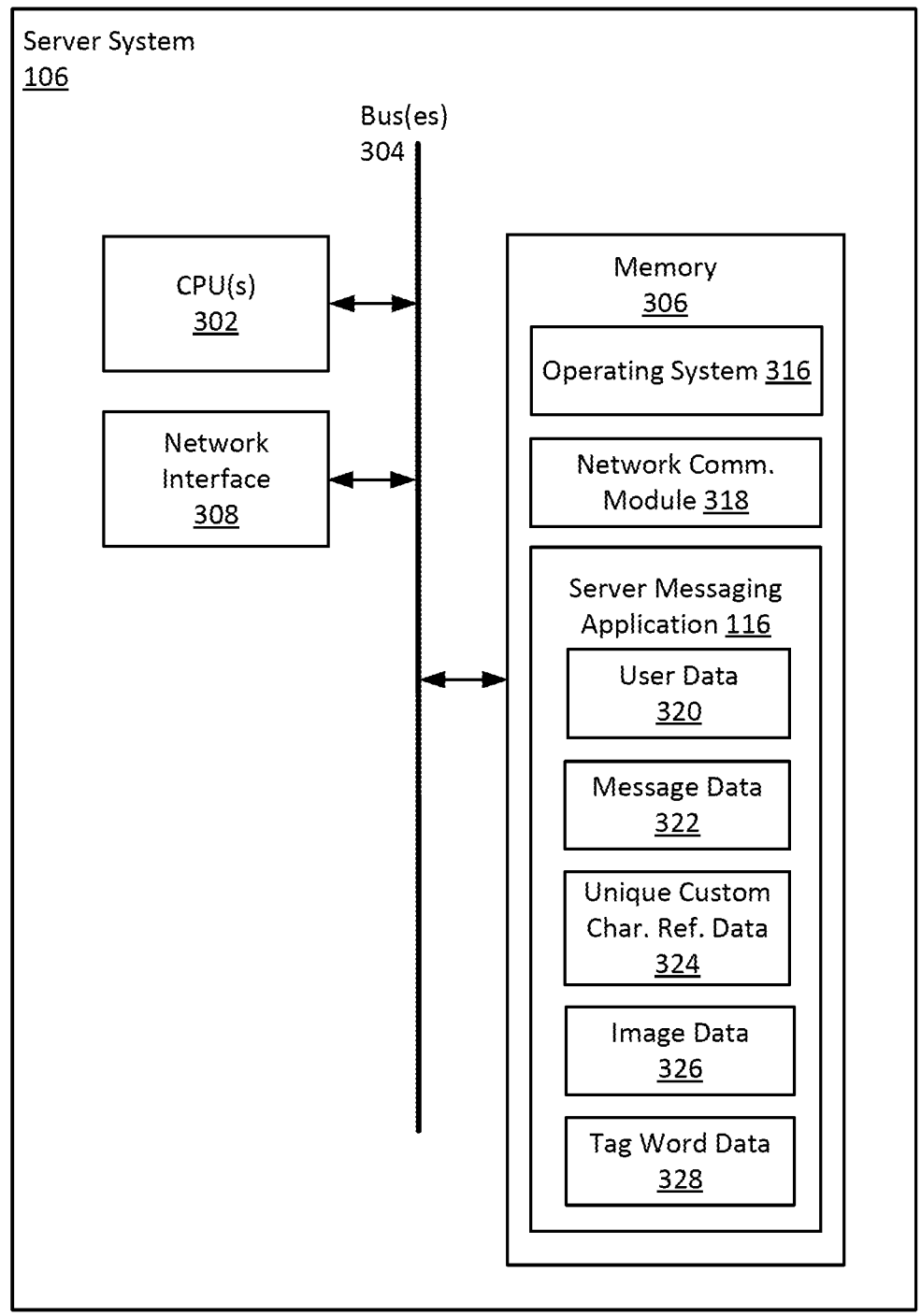
FIG. 3 is high level a block diagram illustrating exemplary details of a server system, included in the exemplary client-server environment introduced in FIG. 1.

FIG. 3 is a block diagram illustrating a server system 106, in accordance with some implementations. The server system 106 typically includes one or more processors (e.g., CPU's) 302, one or more network or other communications interfaces 308, memory 306, and one or more communication buses 304 for interconnecting these components. The communication buses 304 optionally include circuitry (sometimes called a chipset) that interconnects and controls communications between system components. The memory 306 can include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. In some embodiments, memory 306 includes one or more storage devices remotely located from the CPU(s) 302. The memory 306, including the non-volatile and volatile memory device(s) within the memory 306, comprises a non-transitory computer readable storage medium. In some implementations, the memory 306 or the non-transitory computer readable storage medium of memory 306 stores the following programs, modules and data structures, or a subset thereof, including an operating system 316, a network communication module 318, a server messaging application 116, user data 320, message data 322, unique custom character reference data 324, image data 326 and tag word data 328.

The memory 306, and/or other types of storage media of the server system 112 can be referred more generally herein as a data store. Further, because such storage media is associated with the remote server 112, such storage media will often be referred to as a remote data store, so as to distinguish it from a local data store associated with the client device 102.

The operating system 316 includes procedures for handling various basic system services and for performing hardware dependent tasks.

The network communication module 318 facilitates communication with other devices and computers (e.g., client devices 102) via the one or more communication network interfaces 308 (wired or wireless) and one or more communication networks 104, such as the Internet, other wide area networks, local area networks, metropolitan area networks, and so on.

The server messaging application 116 operates a messaging service and performs operations related to the messaging service. In some implementations, the server messaging application 116 connects client devices 102, receives messages and content from client devices 102 and sends the messages and content to their destination client devices 102, and manages the user data 320 for the messaging service. The server messaging application 116 can also store and manage the message data 322, unique custom character reference data 324, image data 326, and tag word data 328.

User data 320 is the data associated with the users of the messaging service. User data 320 can include user account and profile information (e.g., username, user client device ID, user ID, password, etc.) and, for each user, message data sent and received by the user.

The messages data 322 may include a complete archive or repository of the messages send and received by the client devices 102 using the messaging service.

The unique custom character reference data 324, image data 326 and the tag word data 328 can be stored in one or more tables that specify, for each custom character (that has been created by a user of the system 100, or by the company that supports the system 100), a unique custom character reference, image data that enables the custom character to be displayed on a client device 102, a unique user identifier that specifies who produced the custom character, and one or more tag words associated with the custom character. Such tag words may be specified by the creator of the custom character. The unique custom character reference, image data, and tag word(s) that are associated with a custom character can also be referred to individually, or collectively, as custom character metadata. The image data can be formatted in any one of various known or future image data formats, including, but not limited to: JPEG (Joint Photographic Experts Group), GIF (Graphics Interchange Format), TIFF (Tagged Image File Format), EXIF (Exchangeable Image File), BMP (Windows bitmap), PNG (Portable Network Graphics), just to name a few.

Each of the above identified elements may be stored in one or more of the previously mentioned memory devices, and each of the modules or programs corresponds to a set of instructions for performing a function described above. In some embodiments, the set of instructions is executed by one or more processors (e.g., the CPUs 302). The above identified modules or programs need not be implemented as separate software programs, procedures or modules, and thus, in some implementations, various subsets of these modules is combined or otherwise re-arranged. In some implementations, memory 306 stores a subset of the modules and data structures identified above. Furthermore, in some embodiments, memory 306 stores additional modules and data structures not described above.

Although FIG. 3 shows a server system, FIG. 3 is intended more as functional description of the various features which may be present in a set of servers than as a structural schematic of the implementations described herein. In practice, and as recognized by those of ordinary skill in the art, items shown separately could be combined and some items could be separated. For example, some items (e.g., operating system 316 and network communication module 318) shown separately in FIG. 3 could be implemented on single servers and single items could be implemented by one or more servers. The actual number of servers used to implement the server system 106 and how features are allocated among them will vary from one implementation to another, and, in some instances, depends in part on the amount of data traffic that the system must handle during peak usage periods as well as during average usage periods.

Messaging User Interface

Figure 4:
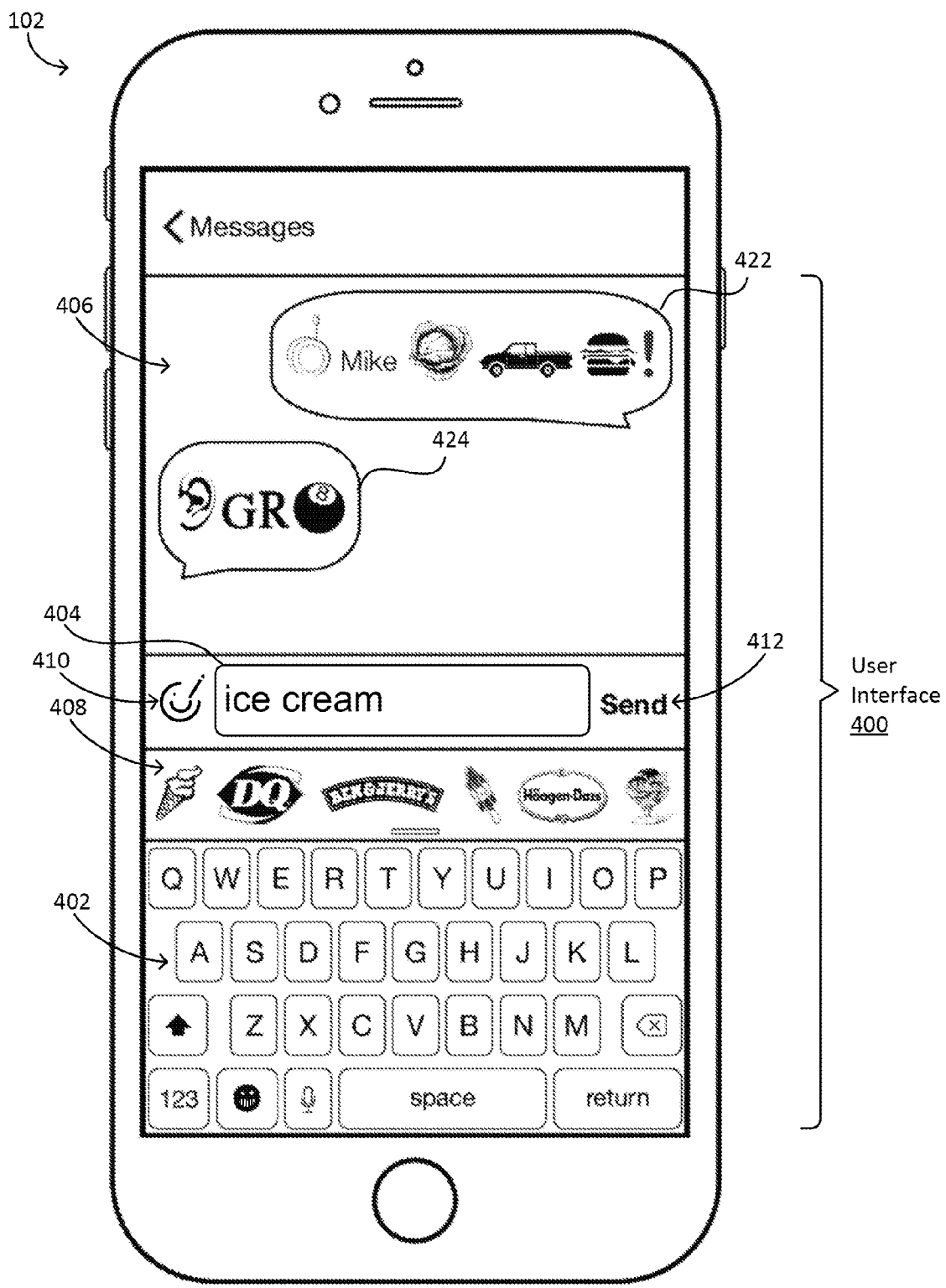
FIG. 4 illustrate an example messaging user interface, in accordance with an implementation of the present technology.

FIG. 4 illustrate an example messaging user interface 400, in accordance with an implementation. The messaging user interface 400 shown in FIG. 4, which can also be referred to more succinctly as the user interface 400, is an example user interface provided by a client messaging application 110 installed on one of the client devices 102. For sake of convenience and as an example of the described implementations, this and other user interfaces are described below as user interfaces for a messaging application 110 on a client device 102 that includes a touch-sensitive display (e.g., a smartphone). The client messaging application is associated with a messaging service operated by the server system 106. The user interface is displayed on the touch-sensitive display of the client device 102. It should be appreciated that the user interface, operations, and interactions described below are applicable to other types of client devices and input devices (e.g., a laptop computer with keyboard and touch pad, a desktop computer with a mouse and keyboard, a tablet device with a touch screen). The user interface 400 can be used to enable a messaging conversation between a user of a client device 102a (whom can be referred to as "User A") and a user of a further client device 102b (whom can be referred to as "User B").

Referring to FIG. 4, the user interface 400 is shown as including a virtual keyboard 402, a message tray 404, a message thread region 406, a custom character tray 408, a create icon 410 and a send icon 412. The message tray 404 is an example of a message entry field in which a user can create a view a message to be sent to another user. The virtual keyboard 402 enables a user to type alphanumeric characters, which will appear in the message entry field 404 as they are typed. The alphanumeric characters can be letter or numbers, or combinations thereof. The virtual keyboard 402 can also allow a user to type mathematical characters, punctuation characters, and/or the like, as is well known in the art. Further, the virtual keyboard 402 can also allow a user to select emoji characters that are supported by the Unicode Standard.

The message thread region 406 is shown as including a right aligned message bubble 422 and a left aligned message bubble 424. The right aligned message bubble 422 is representative of what the user (e.g., User A) of the client device (e.g., 102a) communicated to a further user (e.g., User B) of the further client device (e.g., 102b), and the left aligned message bubble 424 is representative of what the user (e.g., User B) of the further client device (e.g., 102b) communicated to the user (e.g., User A) of the client device (e.g., 102a). Within the exemplary message bubble 422 are five custom characters, and the name "Mike" that includes four standard characters.

Still referring to FIG. 4, as a user types, and more specifically, uses the virtual keyboard 402 to select standard characters (e.g., alphanumeric characters), the selected characters will appear in the message tray 404 (or some other message entry field), so the user can see what they have typed so far. Predictive text and/or spell check technology may be used to suggest words that the user may wish to select for entry in the message tray 404 (or some other message entry field), either to finish or replace a term the user has already typed, as is well known in the art.

The custom character tray 408 displays images of one or more custom characters associated with a tag word that the user has typed. In certain implementations, the custom character tray 408 may also display images of custom characters associated with a tag word suggested using predictive text and/or spell check technology. In FIG. 4, the words "ice cream" are shown as being included in the message tray 404, in response to a user typing those words using the virtual keyboard 402. Below the message tray 404 is the custom character tray 408, which shows six different custom characters that are each related to the words "ice cream". Details of how the custom characters are identified and displayed will be provided below, as are details of how custom characters can be communicated to another user. If the user selects (e.g., taps or swipes) one of the custom characters, then the words (in this case "ice cream") related to the selected custom character will be replaced with the custom character within the message tray 404. Both standard characters (e.g., standard alphanumeric characters) and custom characters can be included with the same message tray 404 (or some other message entry field). In response to the user selecting (e.g., tapping) the send icon 412, message data will be sent to another client device associated with another user (e.g., User B), and the contents message tray 404 (that were displayed when the user selected the send icon 412)

will be moved to the message thread area 406 and shown within a further message bubble (similar to the message bubble 422).

In accordance with certain embodiments of the present technology, custom characters can be displayed without a message bubble. For example, where message data that is sent from one client device to another includes one or more unique custom character references, without including any standard characters, the custom character(s) associated with the received unique custom character reference(s) can be displayed within the message thread region 406 without being included in a message bubble. This displaying of custom character(s) outside a message bubble can occur on the client device that sends message data including unique custom character reference(s), without including any standard characters, and/or on the client device that receives message data including unique custom character reference(s), without including any standard characters. In other embodiments, custom character(s) are always displayed within a message bubble, even if no standard characters are included in the same message bubble. Other variations are also possible and within the scope of the embodiments described herein.

Still referring to FIG. 4, the create icon 410, when selected, causes another screen of the user interface 400 to be shown, which enables the user to create new custom characters. In one implementation, the user can have a first option of drawing a custom character using drawing tools, and a second option of using a photograph to create a custom character. If the user chooses to use drawing tools to create the custom character, e.g., a custom emoji, the user will be presented with tools that enable them to use a touch screen or other input to draw a character of their choosing, which is only limited by their creativity. The user may be also give the option to combine previously created custom characters to create new custom characters. For example, the user may be able to select from a library of facial features (such as hair, eyes, noses, mouths, etc.) to create a custom facial character. If the user chooses to use a photograph to create a custom character, they can select a photograph from their own library, or take a new photograph, and they may be given the option to crop or trim the photograph, and they may also be able to add drawing elements to the photograph and/or apply filters. Other variations are also possible. After the user is finished creating the custom character, they are then prompted to add one or more tags that will thereafter help the user, and potentially other users, find the custom character in the future when typing a message. For example, if the user creates a custom character of a cat, either by drawing or taking a photograph of a cat, then the user can, for example, add the tag words: cat; feline; meow; and kitty. Thereafter, the next time that user (or another user) types one of those tag words in the message input field 404, then an image of the custom character of the cat that the user created will be shown in the custom character tray 408. Tag words can also be referred to more succinctly as tags, or alternatively as key words.

In accordance with an embodiment, a user that creates a custom character is given the option to keep it private, in which case only they can use the custom character, or to make it public, in which case any user of the messaging application will be able to use the custom character. By enabling users to make their custom characters public, a large publically available library of custom characters can be produced in a relatively short period of time.

In accordance with an embodiment, the client device 102 of the user that creates a new custom character assigns a unique custom character reference for the new custom character, and sends to the server system 112 the unique custom character reference, the image data, and the tag word(s) specified by the user that created the custom character. The unique custom character reference can be, e.g., a universally unique identifier (UUID), which is generated using a standard technique for identifying a simply unique 128-bit value used in software construction. The unique custom character identifier can be generated, for example, based on a unique client device identifier (ID), a client ID, and a time stamp produced when the client finished creating the new custom character. In a specific implementation, the following equation is used to calculate unique custom character reference: unique custom character reference=(client device ID)-(user ID)-(current timestamp), wherein the current timestamp is the current time in milliseconds since Jan. 1, 1970. Other variations are possible, and within the scope of embodiments of the present technology. It is also possible that the server system 112 assigns the unique custom character references, instead of the client device 102.

Still referring to FIG. 4, in accordance with an embodiment, in response to a user selecting (e.g., tapping on) a custom character that is shown within a message bubble (e.g., 422 or 424), a larger and higher resolution version of the custom character is shown. This enables the user to better see and appreciate details of the custom character which may not be viewable when the custom character is sized to fit within a message bubble. Additionally, or alternatively, in response to the user selecting (e.g., tapping on) a custom character that is shown within a message bubble (e.g., 422 or 424), one or more tag words associated with custom character is/are displayed, so as to give context to the custom character associated with a message sent by another user. For example, in FIG. 4, if the user of the client device 102 is confused as to what the ear icon (within the message bubble 424) means, the user can select (e.g., tap on) the ear, in response to which the tag word "sounds" will be displayed. Similarly, if the user taps on the custom character including the letters G and R followed by an image of an eight ball, then the tag word "great" may be displayed. This enables the user to better understand what was meant by the characters shown in the message bubble 424. In one implementation, when a user selects (e.g., taps on) a custom character, only the tag word that the user (that sent the message) replaced with the custom character is shown. In another implementation, when a user selects (e.g., taps on) a custom character, all of the tag words (if there are multiple tag words) associated with the custom character are shown. In still another implementation, when a user selects (e.g., taps on) a custom character, all of the tag words (if there are multiple tag words) associated with the custom character are shown, but the tag word that the user (that sent the message) replaced with the custom character is highlighted or otherwise shown differently from the other tag words, so that the reader know which tag word is most relevant to understanding what the custom character meant to the sender. Other variations are also possible, and with the embodiments of the present technology.

Sending Messages Including Custom Characters

Figure 5:
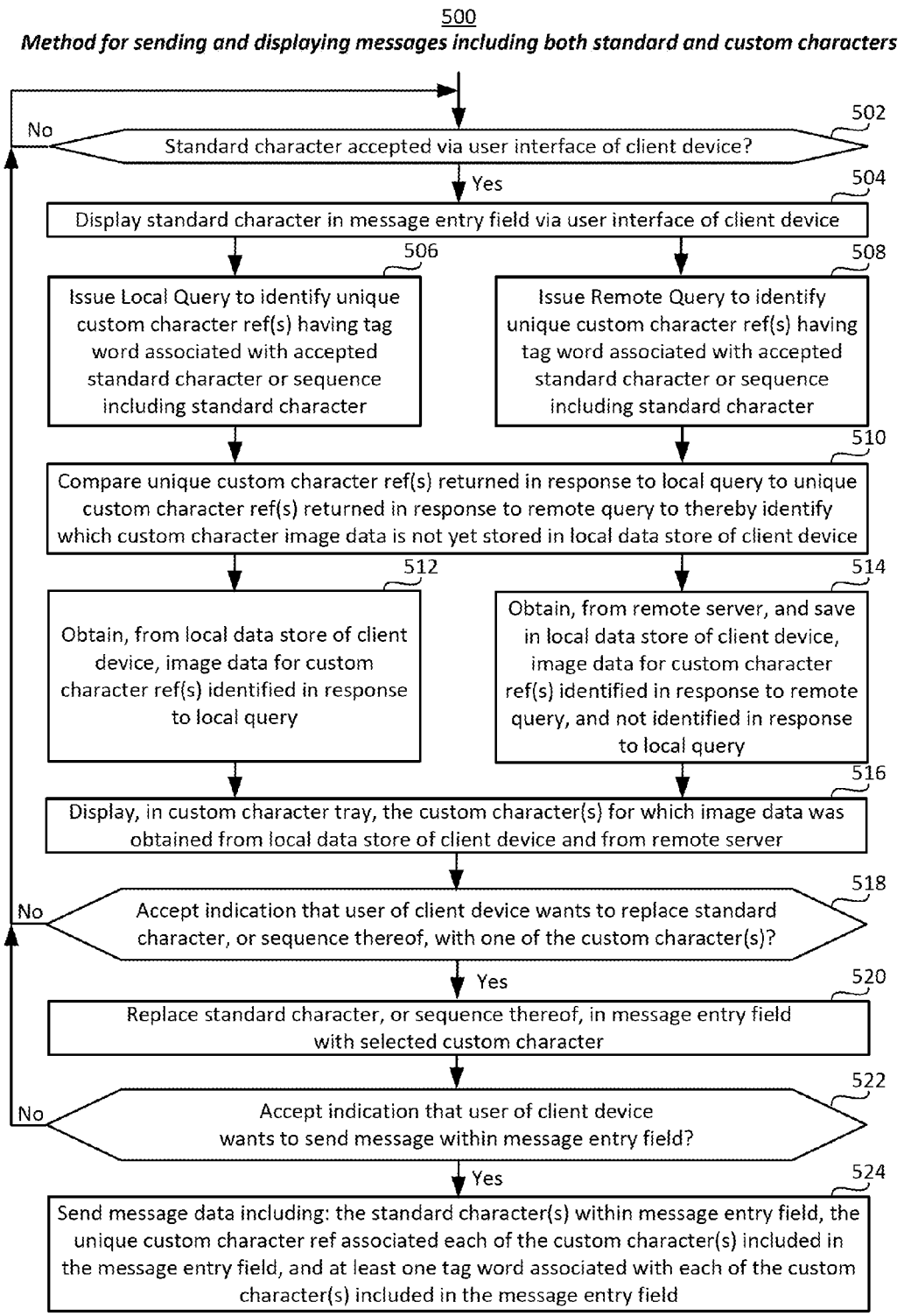
FIG. 5 is a high level flow diagram that is used to summarize a method for authoring, displaying and sending messages including both standard and custom characters.

The high level flow diagram of FIG. 5 will now be used to summarize a method for authoring, displaying and sending a message including one or more standard characters as well as one or more custom characters. Referring to FIG. 5, at step 502 there is a determination of whether a standard character is accepted via a user interface of a client device on which has been installed a messaging application according to an embodiment of the present technology. If the answer to the determination at step 502 is no, then step 502 is repeated. If the answer to the determination at step 502 is yes, then at step 704 the standard character that is accepted is displayed within a message entry field (e.g., 404 in FIG. 4), via a user interface (e.g., 400 in FIG. 4) of the client device (e.g., 102).

As can be seen in FIG. 5, each time a standard character is selected for inclusion in the message entry field (e.g., 404 in FIG. 4) via the user interface of the client device, a local query is issued to a local data store (e.g., memory 206 in FIG. 2) of the client device, as indicated at step 506, and a remote query is issued to a remote server (e.g., 106 in FIG. 1), as indicated at step 508, to thereby identify unique custom character references that have a tag word associated with the accepted standard character or a sequence of standard characters including the accepted standard character, if any exist. For example, assume a user has typed the standard character "c" into the message entry field 404, in response thereto both a local query will be issued to identify unique custom character reference(s) (stored in the local data store of the client device) that have a tag word associated with the standard character "c", and a remote query will be issued to identify unique custom character reference(s) (stored in a remote data store of or accessible to the remote server) that have a tag word associated with the standard character "c". The queries issued at steps 506 and 508 can be more specifically referred to as unique customer character reference queries.

Still referring to FIG. 5, step 510 involves comparing the unique custom character reference(s) that is/are returned in response to the local query (issued at step 506) to the unique custom character reference(s) that is/are returned in response to the remote query (issued at step 508) to thereby identify which custom character image data is not yet stored in the local data store of the client device. For example, assume that the local query returned three (3) unique custom character references, and that the remote query returned five (5) unique custom characters references. In this case, the comparison performed at step 510 would result in the identification of two (2) unique custom character references for which custom character image data has not yet stored in the local data store of the client device.

Step 512 involves obtaining, from the local data store of the client device, the image data for each of the unique custom character reference(s) identified in response to the local query. Step 514 involves obtaining, from the remote server, and saving in the local data store of the client device, the image data for each of the unique custom character reference(s) identified at 510 as not yet having been stored in the local data store of the client device.

Step 516 involves displaying, in a custom character tray (e.g., 408 in FIG. 4), the one or more custom characters for which the image data is obtained from the local data store of the client device and/or from the remote server. For example, step 516 can involve displaying images of five (5) custom characters within the custom character tray 408.

At step 518 there is a determination of whether the user interface of the client device has accepted an indication that the user of the client device wants to replace the typed standard character (or a sequence thereof) with one of the custom characters shown in the custom character tray. The user may provide such an indication by tapping, swiping or otherwise selecting one of the custom characters shown in the custom character tray.

If the answer to the determination at step 518 is no, the flow returns to step 502. If the answer to the determination at step 520 is yes, then the standard characters that was in the message entry field is replaced with the custom character that the user selected. In certain embodiments, the user can select more than one custom character from the custom character tray, e.g., one after the other, and each of the selected custom characters will appear in the message entry field, in the order selected.

Assume, for example, that instead of the user selecting one of the custom characters, the user instead typed another standard characters, such that the characters "ca" now appeared in the message entry field. Flow would then return to step 502, and steps 502-518 would be repeated for the sequence of standard characters "ca". Again, assume that instead of the user selecting one of the custom characters, the user instead typed another standard character, such that the sequence of standard characters "cat" now appeared in the message entry field. This would result in custom characters for the word "cat" being displayed in the custom character tray at an instance of step 516, one or more of which may be selected by the user at step 518, and used to replace the word "cat" within the message entry field at step 520.

At step 522 there is a determination of whether the user interface of the client device has accepted an indication that the user (e.g., User A) of the client device wants to send the message currently shown in the message entry field. If the answer to the determination at step 522 is no, the flow returns to step 502. If the answer to the determination at step 522 is yes, then message data is sent at step 524 from the client device to a further client device associated with a further user (e.g., User B) to which the user wants to send the message. Assume for example, that when the user indicated that they want to send the message (e.g., by selecting the send icon 412 in FIG. 4) that the message entry filed include the words "I like" followed by a custom icon of a cat. Continuing with this example, the message data sent at step 524 would include the standard characters "I like" (i.e., the standard characters included in the message entry field), the unique custom character reference (e.g., a unique 128 bit value) associated with the custom icon for a cat, and the tag word (i.e., "cat") associated with the custom character (in this example, the custom icon for a cat) included in the message entry field. Note that the actual image data for the custom icon for a cat is not sent from the client device (e.g., 102a) to the further client device (e.g., 102b). Rather, by sending of the unique custom character reference associated with each of the custom character(s) included in the message entry field, from the client device (e.g., 102a) to the further client device (e.g., 102b), this enables the further client device (e.g., 102b) to obtain the image data associated with each of the custom character(s) from a local data store of the further client device (if already stored therein) or from the remote server (e.g., 106), and thus, without the client device (e.g., 102a) sending the image data associated with each of the custom character(s) to the further client device (e.g., 102b).

At step 524 it is possible that peer-to-peer communications can be used to send message data directly from one client device (e.g., 102a) to another client device (e.g., 102b). However, it is more likely that the remote server (e.g., 106) will act as an intermediary, such that all message data from one client device (e.g., 102a) to another client device (e.g., 102b) passes through the server (e.g., 106) before being provided from one client device to another. This would enable the server to perform optional encryption, as well as to monitor usage of the messaging application, monitor usage of custom characters, and/or the like.

As noted above, the term "standard character," as used herein, refers to a character that is included in a Unicode Standard, such as Unicode 9.0.0, or some earlier or later Unicode Standard version that is supported by the client device. By contrast, the term "custom character," as used herein, refers to a character that is not included within the Unicode Standard that is supported by the client device, as also noted above. In accordance with an embodiment, the standard characters that are included within the Unicode Standard are selectable by a user of the client device (e.g., 102a) via a virtual keyboard (e.g., 402 in FIG. 4) of the user interface (e.g., 400 in FIG. 4) of the client device, and the image data for the standard characters that are included within the Unicode Standard are provided by the operating system of the client device, which is stored in a local data store of the client device. By contrast, the image data for the custom characters is not provided by the operating system of the client device.

When the messaging application 110 of an embodiment of the present technology is initially downloaded and installed on a client device (e.g., 102a), a library of at least some custom characters may be downloaded and saved on a local data store of the client device at the same time. More specifically, a unique custom character reference for each of a plurality of custom characters can be downloaded and stored on the local data store of the client device. Additionally, image data for each of the plurality of custom characters for which the unique custom character reference can also be stored on the local data store of the client device. Further, one or more tag words can also be stored (in the local data store of the client device) for each of the plurality of custom characters for which the unique custom character reference is stored. Such data can be stored, e.g., in one or more tables. For example, a table can include a column of cells populated by unique custom character references, and a further column of cells populated by one or more tag words associated with each of the unique custom character references. The same table can include a further column including pointers to memory locations where image data associated with each of the unique custom character references are stored. Other variations are also possible and within the embodiments of the present technology.

In accordance with an implementation, users can explore featured, trending or other custom characters and indicate if they "like" individual custom characters. Such information can be stored locally and/or sent to the server and stored remotely. Referring back to the flow diagram of FIG. 5, if a plurality of custom characters are to be displayed at step 516 within the custom character tray, then the custom characters can be ordered so that custom characters most likely preferred by the user are displayed before custom characters that are less likely preferred by the user. The ordering can be based on various factors including, but not limited to: whether the user of the client device created a custom character; whether the user of the client device had indicated that they liked a custom character; a popularity of a custom character as determined based on how many users indicated that they liked the custom character; a local usage of a custom character as determined based on how often the user of the client device has selected the custom character; and/or an overall usage of a custom character as determined based on how many users have sent message data including the unique custom character reference for the custom character. In accordance with an embodiment, custom character(s) created by the user, are shown first; followed by custom character(s) liked by the user; followed by the remaining custom character(s) ordered in their popularity as determined based on how many users indicated that they liked the custom character. Other variations are also possible and within the scope of the embodiments described herein.

Any one of the custom characters can be a custom emoji created using a drawing tool, a custom alphanumeric character created using a drawing tool, a digital image or portion thereof obtained using a digital camera, or digital image or portion thereof obtained using a digital camera and modified using a drawing tool and/or a filter, but is not limited thereto. The drawing tool may be displayed to a user in response to the user selecting the create icon 410 shown in FIG. 4. When a user creates a custom character, the user gets to specify the one or more tag words that are associated with the custom character. More generally, the creator of a custom character specifies the tag words associated therewith.

In accordance with one implementation, the message entry field is a message tray (e.g., 404 in FIG. 4) that is displayed via the user interface of the client device. In such an embodiment, after the message within the message tray (e.g., 404 in FIG. 4) is sent from the client device (e.g., 102a) to the further client device (e.g., 102b), the just sent message is removed from the message tray and is displaying within a message bubble (e.g., 422 in FIG. 4) that is displayed via the user interface of the client device, with the message bubble being part of a displayed message thread (e.g., 406) that may or may not already include other message bubbles. In an alternative implementation, the message entry field can be a message bubble that is displayed via the user interface of the client device, with the message bubble being part of a displayed message thread that may or may not already include other message bubbles.

Receiving Messages Including Custom Characters

Figure 6:
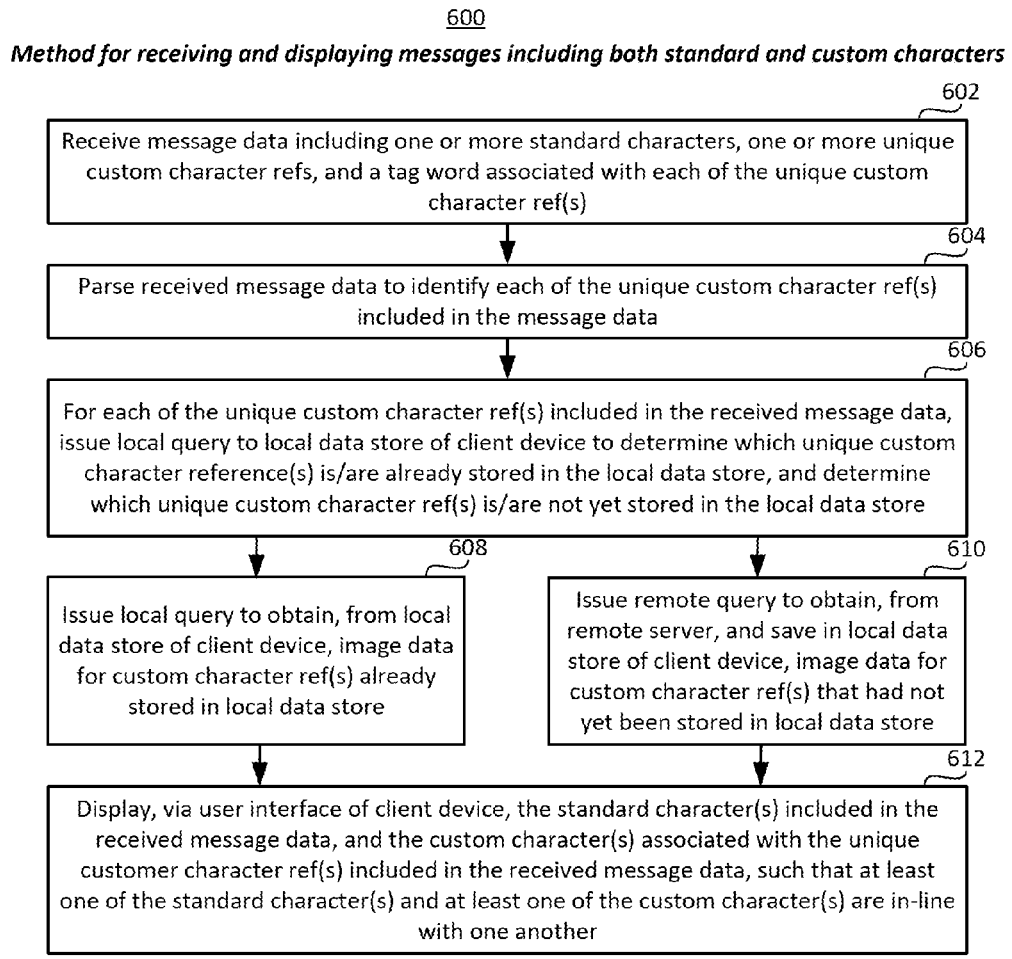
FIG. 6 is a high level flow diagram that is used to summarize a method for receiving and displaying messages including both standard and custom characters.
Figure 7:
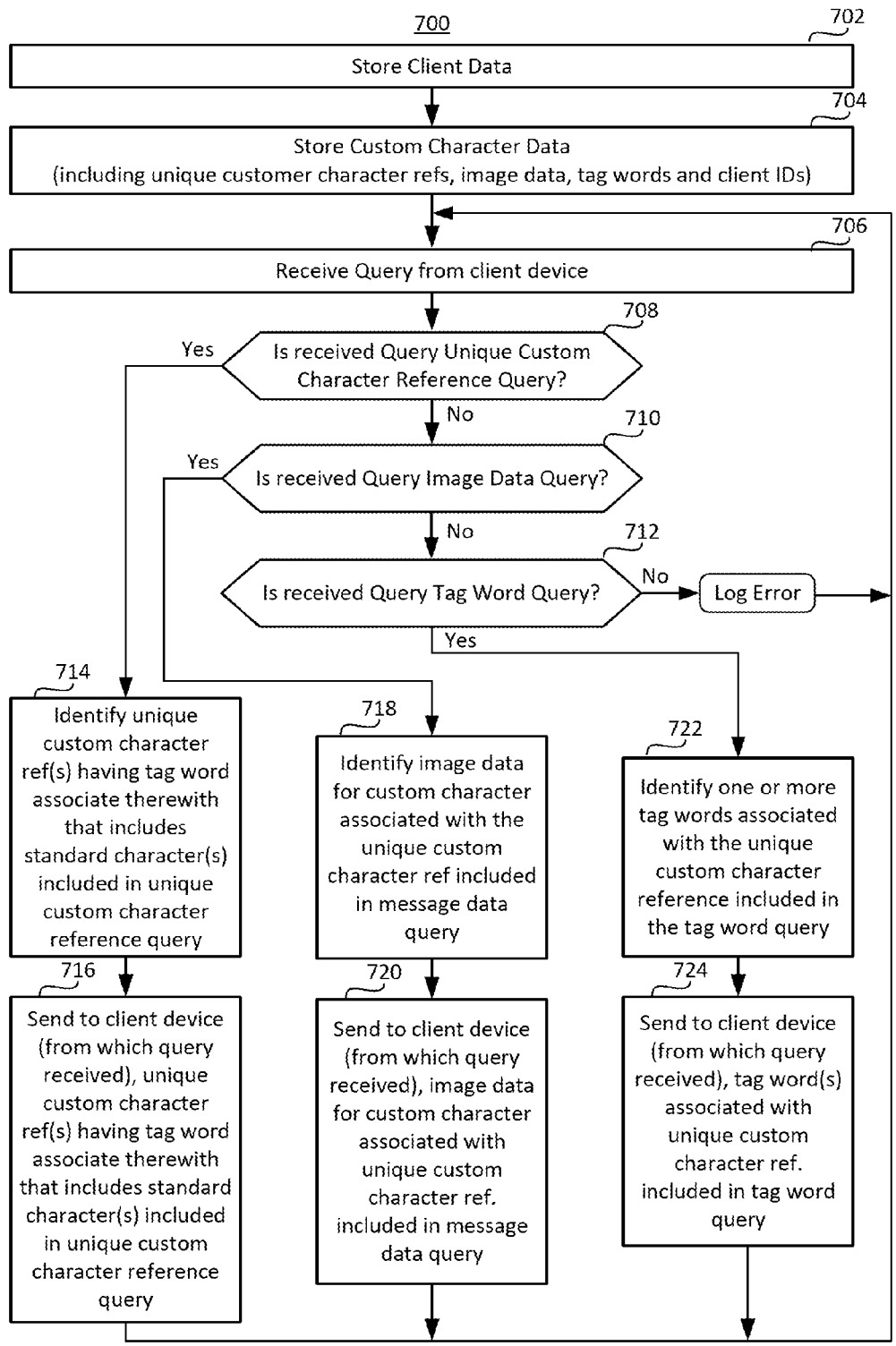
FIG. 7 is a high level flow diagram that is used to summarize a method, performed by a server system, for responding to queries issued by client devices, which enables the client devices to author, display, send and receive messages including both standard and custom characters.

The high level flow diagram of FIG. 6 will now be used to summarize a method for receiving and displaying messages including both standard and custom characters. Referring to FIG. 6, step 602 involves a client device (e.g., 102a) receiving message data from a further client device (e.g., 102b). In accordance with certain embodiments of the present technology, the message data received at step 602 can include one or more standard characters, one or more unique custom character references, and a tag word associated with each of the unique custom character reference(s).

At step 604, the received message data is parsed to identify each of the unique custom character references included in the message data. At step 606 that client device (e.g., 102a) obtains for each of the unique custom character reference(s) included in the received message data, image data for the custom character associated with the unique custom character reference. In accordance with embodiments of the present technology, the image data is obtained by the client device (e.g., 102a) without the client device receiving the image data associated with the custom character(s) from the further client device (e.g., 102b). Rather, at step 606, for each unique custom character reference included in the received message data, the client device issues a local query to the local data store (e.g., the memory 206 in FIG. 2) of the client device to determine which unique custom character reference(s) is/are already stored in the local data store of the client device (if any), and determine which unique custom character reference(s) is/are not yet stored in the local data store (if any). Where the image data for a unique custom character is already stored in the local data store of the client device, the client device obtains the image data from its local data store. More specifically, as indicated at step 608, the client device issues a local query to obtain, from the local data store of the client device, the image data for each of the unique custom character reference(s) that is/are stored in the local data store of the client device. This way, for each unique custom character reference for which the client device determines that the image data associated therewith is stored in the local data store of the client device, the client device obtains that image data associated therewith from the local data store of the client device without the client device issuing a remote query for the image data associated therewith to a remote server.

Still referring to FIG. 6, as indicated at step 610, the client device issues a remote query to obtain, from the remote server (e.g., 106 in FIG. 1), the image data, and one or more tag words, for each of the unique custom character reference(s) included in the received message data that had not yet been stored in the local data store of the client device. Further, the client device saves in the local data store thereof the image data received in response to issuing the remote query therefor to the remote server, as well as unique custom character reference(s) and tag word(s) associated therewith, so that the saved unique custom character reference(s), tag word(s) and image data is thereafter available to the client device at a later time without the client device needing to issue another remote query therefor to the remote server. The queries issued at steps 608 and 610 can be more specifically referred to as image data queries.

Still referring to FIG. 6, step 612 involves displaying, via the user interface (e.g., 400) of the client device (e.g., 102*a*), the one or more standard characters received from the further client device (e.g., 102*b*) in the received message data, and the one or more custom characters that is/are associated with the one or more unique custom character references included in the received message data. In accordance with an implementation, step 612 involves displaying one or more standard characters and one of the one or more custom characters within a message bubble (e.g., 424 in FIG. 4) such that they are in-line with one another within the message bubble. The client device uses the image data associated with a custom character to render or otherwise produce the image of the custom character. The precise size of the custom character that is displayed can be dependent upon a font size that is specified by the user of the client device. For example, if a user of a client device used a control panel of their client device to specify that the font size should be 12 point, then the custom character can be shown in 12 point, or potentially a slightly larger font size (e.g., 14 point), so that the custom character can be included in-line with standard characters that are 12 point. The image data obtained by and stored within the client device may have a greater resolution than is necessary to create such a relative small custom character. However, as noted below, a larger and higher resolution version of a custom character may be displayed in response to a user selecting a custom character that is being displayed in a message bubble. Accordingly the extra resolution may still be utilized.

In accordance with an embodiment, while the client device (e.g., 102*a*) is waiting for the image data for a custom character to be obtained from the remote server, a default placeholder character can be displayed in place of where the custom character is to be placed within the message bubble. Then, after the image data for the custom character has been obtained from the remote server, the default placeholder is replaced by the custom character within the message bubble. The image data for the default placeholder character can be downloaded by a client device when the client device initially download the client messaging application 110.

In accordance with certain embodiments, in response to the user (e.g., User A) of the client device (e.g., 102*a*) selecting one of the custom character(s) that is/are displayed via the user interface of the client device, one or more tag words associated with the selected custom character is also displayed to thereby provide context for the selected custom character. Additionally, or alternative, in response to a user selecting (e.g., tapping on) a custom character that is shown within a message bubble (e.g., 422 or 424), a larger and higher resolution version of the custom character is shown to enable the user to better see and appreciate details of the custom character which may not be viewable when the custom character is sized to fit within a message bubble.

In accordance with an embodiment, when a client device receives message data, the only tag word associated with each unique custom character reference included in the message data is the tag word that was replaced by the user that authored and sent the message. However, it may be beneficial to obtain other tag words associated with each unique custom character reference, if they exist. In accordance with an embodiment, in response to a user of the client device selecting one of the custom character(s) that is/are displayed via the user interface of the client device, the client device issues a remote query to the remote server to obtain therefrom the one or more tag words associated with the selected custom character and stores the tag words in the local data store of the client device. This way further tag words are only received when desired by the user of the client device. Such a query can be more specifically referred to as a tag word query.

Server Query Handling

The high level flow diagram of FIG. 7 will now be used to summarize a method that is performed by a server system (e.g., 106) that is for used for responding to queries issued by client devices, which enables client devices to author, display, send and receive messages including both standard and custom characters. Referring to FIG. 7, step 702 involves storing client data for each of a plurality of clients that have downloaded the client messaging application 110 onto their client device 102. The client data can include, e.g., a unique client identifier (ID), a unique client device ID, a client password, and the like. Step 704 involves storing custom character data, which can include, for each of a plurality of custom characters, the unique custom character reference, image data, one or more tag words, and, in at least some instances, the unique client ID of the client that created the custom character.

Still referring to FIG. 7, step 706 involves receiving a query from a client device, and steps 708, 710 and 712 involve determine what type of query was received from the client device, and more specifically, whether the received query is a unique custom character reference query (e.g., sent as part of step 508 in FIG. 5), an image data query (e.g., sent as part of step 610 in FIG. 6), or a tag word query. The type of query can be specified by a query identifier, the content of the query, or some other context of the query. Other techniques for determining the type of query received are also possible, and within the scope of the embodiments described herein. The queries that are received by the server 112 can also be referred to as remote queries, as was explained above, or as web service calls. A client device 102 may put queries within a queue, which is a pool of threads, and send the queries in the order in which they are generated by the client device 102. Similarly, the server 112 can put received queries in a queue, and respond to the queries in the order in which they are received. It is also possible, and likely, that the server can use distributed processing to respond to multiple queries at the same time.

A unique custom character reference query, which is received from a client device at step 706, will include one or more standard characters that were selected by a user of the client device from which the query was received. If it is determined that a unique custom character reference query has been received, then at step 714 the server identifies one or more of the unique custom character references that have a tag word associate therewith that includes the one or more standard characters included in the unique custom character reference query. Then, at step 716, a list of the unique custom character reference(s) identified at step 714 (as having a tag word associate therewith that includes the one or more standard characters included in the unique custom character reference query) is sent to the client device from which the unique custom character reference query was received.

An image data query, which is received from a client device at step 706, will include a unique custom character reference. If it is determined that an image data query has been received, then at step 718 the server identifies image data for a custom character associated with the unique custom character reference included in the image data query. Then, at step 720, the image data identified at step 718 (for the custom character associated with the unique custom character reference included in the image data query) is sent to the client device from which the image data query was received. As noted above, the image data can be formatted in any one of various known or future image data formats, including, but not limited to: JPEG (Joint Photographic Experts Group), GIF (Graphics Interchange Format), TIFF (Tagged Image File Format), EXIF (Exchangeable Image File), BMP (Windows bitmap), PNG (Portable Network Graphics), just to name a few.

A tag word query, which is received from a client device at step 706, will include a unique custom character reference. If it is determined that a tag word query has been received, then at step 722 the server identifies one or more tag words associated with the unique custom character reference included in the tag word query. Then, at step 724, the tag word(s) identified at step 722 (for the unique custom character reference included in the tag word query) is sent to the client device from which the tag word query was received.

Embodiments of the present technology described above can be used to overcome the various limitations associated with Unicode Standard emoji, and more generally, with Unicode Standard characters. As explained above, certain embodiments of the present technology allow custom (i.e., non-Unicode Standard) emoji and/or other custom characters to be created and/or selected by users for sending from one client device to another. Beneficially, such embodiments enable the custom (i.e., non-Unicode standard) emoji and other custom characters to be included within the same message bubble as, and in-line with Unicode Standard characters, which are also referred to herein more succinctly as standard characters. Additionally, embodiments of the present technology described above enable the creation and sharing of custom emoji and/or other custom characters that the Unicode Technical Committee has indicated that they will exclude from being included in the Unicode Standard, such as, but not limited to, images or icons of company logos, products strongly associated with a particular brand, as well as images or icons of specific people (whether historic or living) and deities. Further, when a message including custom characters is send from one client device to another client device using embodiments of the present technology, the custom characters will always look the same, regardless of the client device and version of the operating system that is running on the client device. These and other benefits can be achieved using embodiments of the present technology, as can be appreciated from the above description.

The subject matter described herein may be embodied in systems, apparatus, methods, and/or articles depending on the desired configuration. In particular, various implementations of the subject matter described herein may be realized in computer software, firmware or hardware and/or combinations thereof, as well as in digital electronic circuitry, integrated circuitry, and the like. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs), but not limited thereto) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, certain the subject matter described herein may be implemented on a computer having a display device (e.g., a cathode ray tube (CRT) or liquid crystal display (LCD) monitor, but not limited thereto) for displaying information to the user and a keyboard, touch screen and/or a pointing device (e.g., a mouse, touchpad or a trackball, but not limited thereto) by which the user may provide input to the computer. Other kinds of devices may be used to provide for interaction with a user, administrator and/or manager as well; for example, feedback provided to the user, administrator and/or manager may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface (GUI) or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include, but are not limited to, a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

While various embodiments of the present invention have been described above, it should be understood that they have been presented by way of example, and not limitation. It will be apparent to persons skilled in the relevant art that various changes in form and detail can be made therein without departing from the spirit and scope of the invention. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present invention have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

The breadth and scope of the present invention should not be limited by any of the above-described exemplary embodiments, but should be defined only in accordance with the following claims and their equivalents.

Although the subject matter has been described in language specific to structural featuresp and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for displaying and sending messages including both standard and custom characters, the method comprising:
   (a) accepting and displaying, via a user interface of a client device, a message within a message entry field, wherein
      the message includes one or more standard characters and one or more custom characters that are selected by a user of the client device,
      a unique custom character reference, one or more tag words, and image data are associated with each of the custom character(s),
      each of the standard character(s) is included within a Unicode Standard, and
      each of the custom character(s) is not included within the Unicode Standard;
   (b) in response to accepting an indication that the user of the client device wants to send the message within the message entry field to a second user of a second client device, sending, from the client device to the second client device, message data that includes the following
      the one or more standard characters included in the message entry field,
      the unique custom character reference associated with each of the custom character(s) included in the message entry field, and
      at least one tag word associated with each of the custom character(s) included in the message entry field;
      wherein the sending of the unique custom character reference associated with each of the custom character(s) included in the message entry field, from the client device to the second client device, enables the second client device to obtain the image data associated with each of the custom character(s) from a local data store of the second client device or from a remote server, and thus, without the client device sending the image data associated with each of the custom character(s) to the second client device;
      wherein the standard characters that are included within the Unicode Standard are selectable by the user of the client device via a virtual keyboard of the user interface of the client device;
      wherein image data for the standard characters that are included within the Unicode Standard are provided by the operating system of the client device, which is stored in a local data store of the client device; and
      wherein the image data for each of the custom character(s) is not provided by the operating system of the client device.

2. The method of claim 1, further comprising storing the following within the local data store of the client device:
   a unique custom character reference for each of a plurality of custom characters;
   image data for each of the plurality of custom characters for which the unique custom character reference is stored; and
   one or more tag words for each of the plurality of custom characters for which the unique custom character reference is stored.

3. The method of claim 2, wherein the accepting and displaying at step (a) includes:
   (a.1) each time a standard character is selected for inclusion in the message entry field via the user interface of the client device, issuing both a local query to the local data store of the client device and a remote query to a remote server to identify unique custom character reference(s) that have a tag word associated with the accepted standard character or a sequence of standard characters including the accepted standard character, if any exist;
   (a.2) comparing the unique custom character reference(s) that is/are returned in response to the local query to the unique custom character reference(s) that is/are returned in response to the remote query to thereby identify which custom character image data is not yet stored in the local data store of the client device;

(a.3) obtaining, from the local data store of the client device, the image data for each of the unique custom character reference(s) identified in response to the local query;

(a.4) obtaining, from the remote server, and saving in the local data store of the client device, the image data for each of the unique custom character reference(s) identified at (a.2) as not yet having been stored in the local data store of the client device; and (a.5) displaying, in a custom character tray, the one or more custom characters for which the image data is obtained from the local data store of the client device and from the remote server.

4. The method of claim 1, wherein when a plurality of custom characters are to be displayed within a custom character tray, step (a) further comprising ordering the custom characters that are displayed in the custom character tray in dependence on at least one of the following:

(i) whether the user of the client device created a custom character;

(ii) whether the user of the client device had indicated that they liked a custom character;

(iii) a popularity of a custom character as determined based on how many users indicated that they liked the custom character;

(iv) a local usage of a custom character as determined based on how often the user of the client device has selected the custom character; and/or (iv) an overall usage of a custom character as determined based on how many users have sent message data including the unique custom character reference for the custom character.

5. The method of claim 1, wherein any one of the custom character(s) can be a custom emoji created using a drawing tool, a custom alphanumeric character created using a drawing tool, a digital image or portion thereof obtained using a digital camera, or digital image or portion thereof obtained using a digital camera and modified using a drawing tool and/or a filter.

6. The method of claim 1, wherein any one of the custom character(s) can be or have been created by the user of the client device, or can have been created by a different user of a different client device, and wherein the creator of a said custom character specifies the one or more tag words that is/are associated with the custom character.

7. The method of claim 1, further comprising:
enabling the user of the client device to create one or more new custom characters and to specify one or more tag words for each of the new custom characters that the user creates; and
enabling the user of the client device to include one or more of the new custom character(s) within the message entry field.

8. The method of claim 1, wherein the message entry field comprises a message tray that is displayed via the user interface of the client device, and further comprising:

(c) after message data for a message within the message tray is sent from the client device to the second client device, displaying the message for which the message data that was sent within a message bubble that is displayed via the user interface of the client device, with the message bubble being part of a displayed message thread that may or may not already include other message bubbles.

9. The method of claim 1, wherein the message entry field comprises a message bubble that is displayed via the user interface of the client device, with the message bubble being part of a displayed message thread that may or may not already include other message bubbles.

10. A method for receiving and displaying messages including both standard and custom characters, the method comprising:

(a) a client device receiving message data from a second client device,
wherein
the message data includes one or more standard characters, one or more unique custom character references, and a tag word associated with each of the unique custom character reference(s),
each of the standard character(s) is included within a Unicode Standard, and
each of the unique custom character references is associated with a corresponding custom character that is not included within the Unicode Standard;

(b) the client device obtaining, for each of the unique custom character reference(s) included in the received message data, image data for the custom character associated with the unique custom character reference, wherein the client device obtaining the image data for the custom character(s) associated with the unique custom character reference(s) comprises:

(b.1) the client device determining, for each unique custom character reference of the one or more unique custom character references the is/are received by the client device from the second client device, whether image data associated with the unique custom character reference is stored in a local data store of the client device;

(b.2) for each unique custom character reference for which the client device determines that the image data associated therewith is stored in the local data store of the client device, the client device obtaining that image data associated therewith from the local data store of the client device without the client device issuing a remote query for the image data associated therewith to a remote server;

(b.3) for each unique custom character reference for which the client device determines that the image data associated therewith is not stored in the local data store of the client device, the client device issuing a remote query for the image data associated therewith to a remote server and receiving the image data associated therewith from the remote server; and (b.4) the client device saving in the local data store thereof the image data received in response to issuing the remote query therefor to the remote server, so that the saved image data is thereafter available to the client device at a later time without the client device needing to issue another remote query therefor to the remote server;

wherein the client device obtaining the image data for the custom character(s) associated with the unique custom character reference(s) is performing without the client device receiving the image data associated with the custom character(s) from the second client device; and (c) displaying, via a user interface of the client device, the one or more standard characters received from the second client device and the one or more custom characters that is/are associated with the one or more unique custom character references included in the received message data.

11. The method of claim 10, wherein:
image data for the standard characters that are included within the Unicode Standard are provided by the operating system of the client device, which is stored in a local data store of the client device; and the image data for each of the custom character(s) is not provided by the operating system of the client device.

12. The method of claim 10, wherein the displaying at step (c) includes displaying, within a message bubble, at least one of the one or more standard characters and at least one of the one or more custom characters such that they are in-line with one another within the message bubble.

13. The method of claim 10, wherein step (c) includes, while waiting for the image data for a said custom character to be obtained from the remote server, displaying a default placeholder character in place of where the custom character is to be placed within a message bubble, and replacing the default placeholder character within the message bubble with the custom character after the image data for the custom character has been obtained from the remote server.

14. The method of claim 10, further comprising:
(d) in response to a user of the client device selecting one of the custom character(s) that is/are displayed via the user interface of the client device, also displaying, via the user interface of the client device, one or more tag words associated with the selected custom character to thereby provide context for the selected custom character.

15. The method of claim 14, wherein step (d) also includes, in response to a user of the client device selecting one of the custom character(s) that is/are displayed via the user interface of the client device, issuing a remote query to a remote server and obtaining therefrom the one or more tag words associated with the selected custom character and storing the tag words in the local data store of the client device.

16. The method of claim 10, further comprising:
(d) in response to accepting a selection of one of the custom character(s) that is/are displayed via the user interface of the client device, displaying, via the user interface of the client device, a larger and higher resolution version of the selected custom character.

17. One or more processor readable storage devices having instructions encoded thereon which when executed cause one or more processors of a client device to provide a client messaging application operable to:
provide a messaging user interface for the device;
store, within a local data store of the client device, a unique custom character reference for each of a plurality of custom characters, image data for each of the plurality of custom characters for which the unique custom character reference is stored, and one or more tag words for each of the plurality of custom characters for which the unique custom character reference is stored;
accept and display, via the messaging user interface of a client device, a message within a message entry field;
issue both a local query to the local data store of the client device and a remote query to a remote server, each time a standard character is selected for inclusion in the message entry field via the user interface of the client device, to thereby identify unique custom character references that have a tag word associated with the accepted standard character or a sequence of standard characters including the accepted standard character, if any exist;
compare the unique custom character reference(s) that is/are returned in response to the local query to the unique custom character reference(s) that is/are returned in response to the remote query to thereby identify which custom character image data is not yet stored in the local data store of the client device;
obtain, from the local data store of the client device, the image data for each of the unique custom character reference(s) identified in response to the local query;
obtain, from the remote server, and save in the local data store of the client device, the image data for each of the unique custom character reference(s) identified as not yet having been stored in the local data store of the client device; and
display, in a custom character tray, the one or more custom characters for which the image data is obtained from the local data store of the client device and/or from the remote server;
accept an indication that the user of the client device wants to send the message being displayed within the message entry field to a second user of a second client device;
send, from the client device to the second client device in response to the indication being accepted, message data that includes the following:
the one or more standard characters included in the message entry field when the indication is accepted,
the unique custom character reference associated with each of one or more custom characters included in the message entry field when the indication is accepted, and
the at least one tag word associated with each of the custom character(s) included in the message entry field when the indication is accepted,
wherein each of the standard character(s) is included within a Unicode Standard, and
wherein each of the custom character(s) is not included within the Unicode Standard.

18. The one or more processor readable storage devices of claim 17, wherein the client messaging application is operable to enable a user of the client device to create one or more new custom characters and to specify one or more tag words for each of the new custom characters that the user creates, and enable the user of the client device to include one or more of the new custom character(s) within the message entry field.

19. The one or more processor readable storage devices of claim 17, wherein the message entry field comprises a message tray that is displayed via the user interface, and wherein the client messaging application is operable to display a message, corresponding to message data that has been sent from the client device to the second client device, within a message bubble that is displayed via the user interface of the client device, with the message bubble being part of a displayed message thread that may or may not already include other message bubbles.

20. The one or more processor readable storage devices of claim 17, wherein the client messaging application is also operable to:
receive message data from the second client device, wherein the received message data includes one or more standard characters, one or more unique custom character references, and a tag word associated with each of the unique custom character reference(s) included in the received message data,
obtain, for each of the unique custom character reference(s) included in the received message data, image data for the custom character associated with the unique custom character reference, without the client device receiving the image data associated with the custom character(s) from the second client device; and display, via the user interface of the client device, the one or more standard characters received from the second client device and the one or more custom characters that is/are associated with the one or more unique custom character references included in the received message data.

21. The one or more processor readable storage devices of claim 20, wherein in order to obtain the image data for the custom character(s) associated with the unique custom character reference(s) included in the received message data, the client messaging application is operable to:
   determine, for each unique custom character reference of the one or more unique custom character references that is/are received by the client device from the second client device, whether image data associated with the unique custom character reference is stored in the local data store of the client device;
   obtain, from the local data store of the client device, the image data associated with each unique custom character reference for which the client device determines that the image data associated therewith is stored in the local data store of the client device; and
   obtain, from a remote data store associated with the remote server, the image data associated with each unique custom character reference for which the client device determines that the image data associated therewith is not stored in the local data store of the client device.

22. The one or more processor readable storage devices of claim 21, wherein the client messaging application is operable to:
   display a default placeholder character in place of where a said custom character is to be placed within a message bubble, while waiting for the image data for the custom character to be obtained from the remote server; and
   replace the default placeholder character within the message bubble with the custom character after the image data for the custom character has been obtained from the remote server.

23. The one or more processor readable storage devices of claim 21, wherein the client messaging application is operable to save in the local data store of the client device the image data received in response to issuing the remote query therefor to the remote server, so that the saved image data is thereafter available to the client messaging application at a later time without the client messaging application needing to issue another remote query therefor to the remote server.

24. A server system, comprising:
   one or more processors;
      one or more data stores configured to store
         client data for each of a plurality of clients that are each associated with a respective client device;
         a unique custom character reference, one or more tag words, and image data associated with each of a plurality of custom characters; and
      a server messaging application including instructions that are executable by the one or more processors, the server messaging application operable to:
         receive a unique custom character reference query including one or more standard characters from a said client device, and in response thereto, identify one or more of the unique custom character references that have a tag word associate therewith that includes the one or more standard characters included in the unique custom character reference query;
         send to the client device from which the unique custom character reference query was received, a list of the identified one or more of the unique custom character references that have a tag word associate therewith that includes the one or more standard characters included in the unique custom character reference query;
         receive an image data query including a unique custom character reference from the client device, and in response thereto, identify image data for a custom character associated with the unique custom character reference included in the image data query; and
         send to the client device from which the image data query was received, image data for the custom character associated with the unique custom character reference included in the image data query;
         wherein the standard characters that are included within the Unicode Standard are selectable by the user of the client device via a virtual keyboard of the user interface of the client device;
         wherein image data for the standard characters that are included within the Unicode Standard are provided by the operating system of the client device, which is stored in a local data store of the client device; and
         wherein the image data for each of the custom character(s) is not provided by the operating system of the client device.

25. The server system of claim 24, wherein the server messaging application is also operable to:
   receive a tag word query including a unique custom character reference from the client device, and in response thereto, identify one or more tag words associated with the unique custom character reference included in the tag word query; and
   send to the client device from which the tag word query was received, the one or more tag words associated with the unique custom character reference included in the tag word query.

26. The server system of claim 24, wherein the server messaging application is also operable to:
   receive from a said client device associate with a said user, image data associated with a new custom character created by the user and one or more tag words that the user specified as being associated with new custom character;
   store within at least one of the one or more data stores, a unique custom character reference for the new custom character, the one or more tag words associated therewith, and the image data associated therewith.

* * * * *

UNITED STATES PATENT AND TRADEMARK OFFICE
CERTIFICATE OF CORRECTION

PATENT NO. : 9,794,202 B1  
APPLICATION NO. : 15/352328  
DATED : October 17, 2017  
INVENTOR(S) : Pereira et al.

Page 1 of 1

It is certified that error appears in the above-identified patent and that said Letters Patent is hereby corrected as shown below:

In the Claims

Column 28, Claim 10, Line 27: After "references" and before "is/are", delete "the" and insert -- that --.

Column 28, Claim 10, Line 35: After "obtaining" and before "image", delete "that" and insert -- the --.

Signed and Sealed this  
Fourth Day of December, 2018

Andrei Iancu  
*Director of the United States Patent and Trademark Office*